(No Model.)
L. S. WHEELER.
HARROW.
No. 267,294. Patented Nov. 7, 1882.
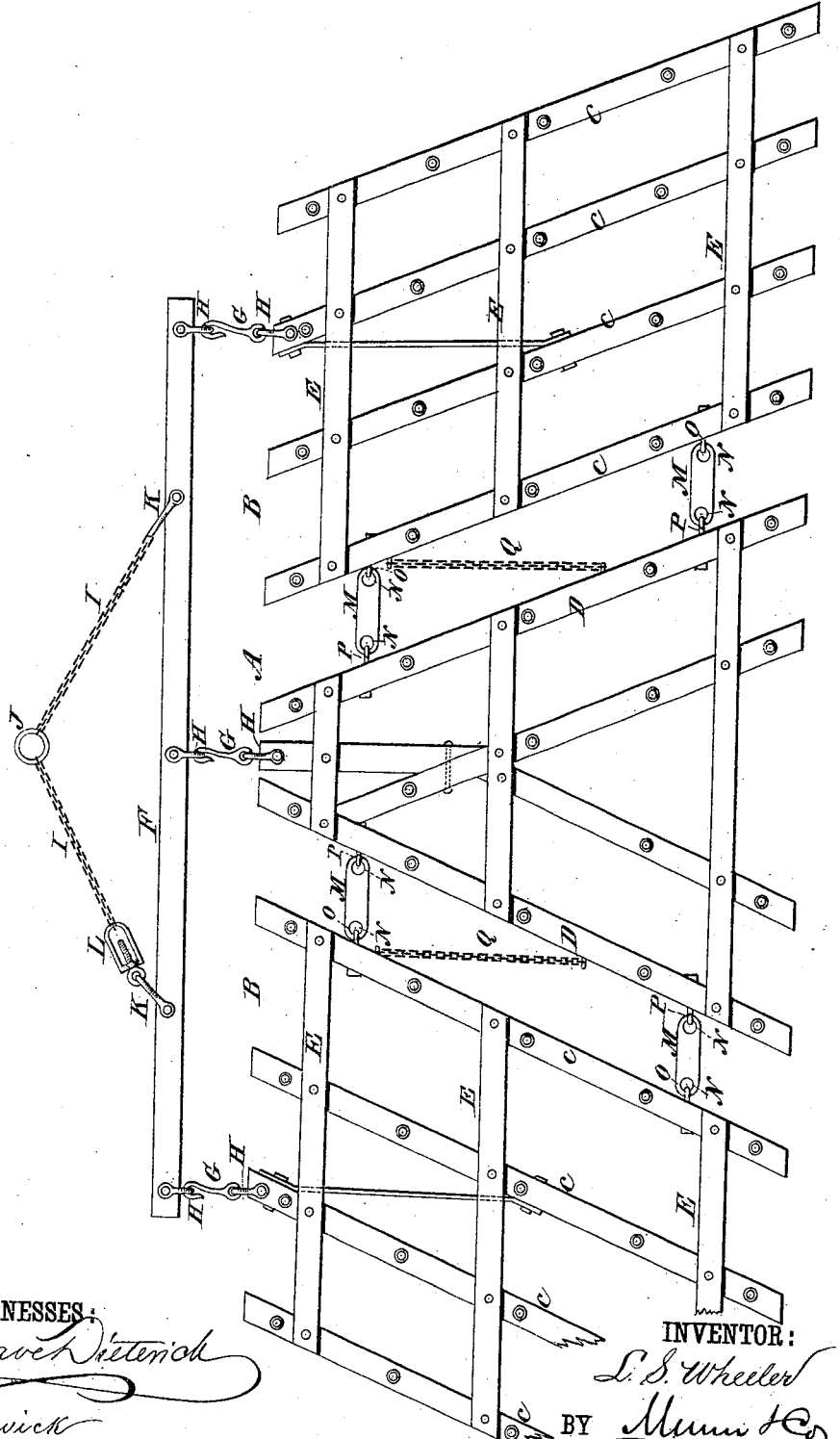
WITNESSES:
Gustave Dieterich
C. Sedgwick
INVENTOR:
L. S. Wheeler
BY Munn & Co
ATTORNEYS.

UNITED STATES PATENT OFFICE.

LAURENS S. WHEELER, OF INDEPENDENCE, KANSAS.

HARROW.

SPECIFICATION forming part of Letters Patent No. 267,294, dated November 7, 1882.

Application filed March 29, 1882. (No model.)

*To all whom it may concern:*

Be it known that I, LAURENS S. WHEELER, of Independence, in the county of Montgomery and State of Kansas, have invented a new and Improved Harrow, of which the following is a full, clear, and exact description.

This invention relates to harrows of two or more sections connected to work together as one, but having the advantage of adaptability to the uneven surface of the ground, which a single construction does not possess.

The invention consists of improvements in the connecting devices for the several sections and in the draft-connections, all as hereinafter described.

Reference is to be had to the accompanying drawing, forming part of this specification, which represents a harrow in plan view, with my improvements thereon.

The harrow is in this example composed of a middle ∧-shaped section, A, and two side sections, B, the latter consisting of four bars, c, ranging parallel to each other and to the ∧-bars D of the middle section, and three cross-bars, E, oblique to the bars c, but parallel to each other and to the ends of said sections B, which are oblique to the sides, but in line with the ends of middle section, A.

F is the draft-bar, which I connect at the middle to section A by hook G and clevises H, and at the ends to the sections B, respectively, by similar hooks and devices, and to the bar I connect the draft-chains I with attaching-ring J by clevises K, and an equalizing-swivel, L, in one of said chains, by which it may be made equal to or longer or shorter than the other, as may be required.

By employing four bars in the outer sections, B, and connecting them by the next to the outer bar to the draft-bar the line of draft is about through the center-line of the said sections from front to rear, thereby making the draft on them equal, or very nearly so, as to the two sides of the center-line. I connect the side sections to the middle sections by the bar-links M, having a hole, N, in each end, and the eyebolts O P, the bolts P having an open eye for a detaching-hook. By these connections the sections are maintained in their relative positions about as well as if they were rigidly connected when going straight ahead, or nearly so; but when turning short about one may advance or fall back more than another, and therefore I also connect them by the chains Q, arranged in the line of draft, which equalizes them in that condition also, and thus I obtain the most even and uniform condition of the sections at all times and in all positions of any sectional harrow now used.

I do not mean to limit myself to the rigid bar-links and eyebolts, for any device that will effect the same object may be used, said object being to so couple the sections that they will neither approach to nor recede from each other, being held apart by the bar-links, and at the same time being free to rise and fall as the inequalities of the ground may demand.

The harrow herein shown and described may, by the use of a proper number and style of teeth, be used effectively both as a pulverizing-harrow and as a smoothing-harrow. As a pulverizer it is preferred to arm bars c with five straight teeth, and as a smoothing-harrow, to which use the implement is especially well adapted, it is preferred to arm each bar c with seven teeth set at a backward inclination of from thirty-five to forty degrees, the construction and arrangement of the harrow being such as shall promote most satisfactory results in either pulverizing or smoothing the soil.

Having thus fully described my invention, I claim as new and desire to secure by Letters Patent—

1. A harrow consisting of a ∧-shaped middle section and two diamond-shaped side sections, the three sections being flexibly connected with the same double-tree and with each other, as shown and described.

2. The said middle section, A, and outer sections, B, connected by chains Q, arranged in the line of draft, substantially as specified.

3. The harrow-sections A and B, connected by chains Q, arranged in the line of draft, in combination with the bar-link and eyebolt-connections, substantially as specified.

4. The harrow-sections A and B, draft-bar F, chains Q, and bar and eyebolt connections M and O P, all combined and arranged substantially as specified.

LAURENS S. WHEELER.

Witnesses:
GEO. S. BEARD,
J. M. NEVINS.